United States Patent [19]

Berghman

[11] Patent Number: 4,741,559
[45] Date of Patent: May 3, 1988

[54] COUPLING PROTECTOR

[76] Inventor: Earle E. Berghman, P.O. Box 196, Norton, Mass. 02766

[21] Appl. No.: 55,174

[22] Filed: May 28, 1987

[51] Int. Cl.$^4$ ............................................. F16L 11/12
[52] U.S. Cl. ...................................... 285/45; 285/419
[58] Field of Search ............................. 285/45, 80, 419

[56] References Cited

U.S. PATENT DOCUMENTS

| 3,456,965 | 7/1969 | Gajewski et al. | 285/419 X |
| 4,284,298 | 8/1981 | Kaufmann | 285/302 |
| 4,358,140 | 11/1982 | Jonsson | 285/80 |
| 4,615,543 | 10/1986 | Cannon | 285/12 |

FOREIGN PATENT DOCUMENTS

| 8101320 | 5/1981 | European Pat. Off. | 285/45 |
| 1022063 | 1/1958 | Fed. Rep. of Germany | 285/45 |

Primary Examiner—Dave W. Arola

[57] ABSTRACT

A hose coupling protection device has first and second half portions that are substantially identical each of which have a central chamber therein for the reception of the female fastening element of a hose connector. The central chamber and the semi-circular recesses extending therefrom are sized to permit free rotation of the hose coupling within the protector body.

1 Claim, 1 Drawing Sheet

COUPLING PROTECTOR

BACKGROUND OF THE INVENTION

Standard hose couplings either of the domestic variety or of the industrial type have long been in use for joining hose ends in end-to-end relationship. These couplings provide an efficient economical and readily manipulable coupling which can be assembled and disassembled in a minimum of time without any special tools. The couplings are generally made from brass and are considered costly with respect to the cost of the hose which they are connecting. In most environments in which the hose is used, there is a danger of construction equipment or even garden equipment running over the coupling and collapsing the same due to the extreme force placed upon the coupling of a concentrated nature.

There are no known prior art developments for this purpose, but related in this field is U.S. Pat. No. 4,615,543 (285-12) which claims a tubing protector for production tubing strings employed in the oil and gas industry and U.S. Pat. No. 4,284,298 (285-302) for a tubing coupling clamp.

SUMMARY OF THE INVENTION

The present invention is directed to a device for protecting hose with couplings of the mating male and female variety. A pair of half sections, being half a cylinder are provided which may be interconnected at respective longitudinal edges. Suitable interengaging means are provided on the edges so that the two half cylinders may be aligned in mating relationship. The half sections have outer walls of non-circular section and are preferably hexagonal or pentagonal and the inner wall of the half sections have a central chamber for the reception of the female fastening portion of the coupling. Suitable locking means are provided to fasten the two half cylinders together.

DETAILED DESCRIPTION

Figure 1:
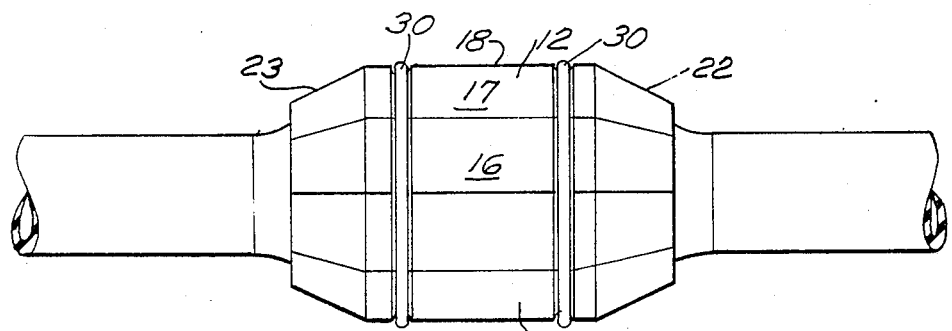
FIG. 1 is an elevational view illustrating the coupling protector of the present invention.
Figure 2:
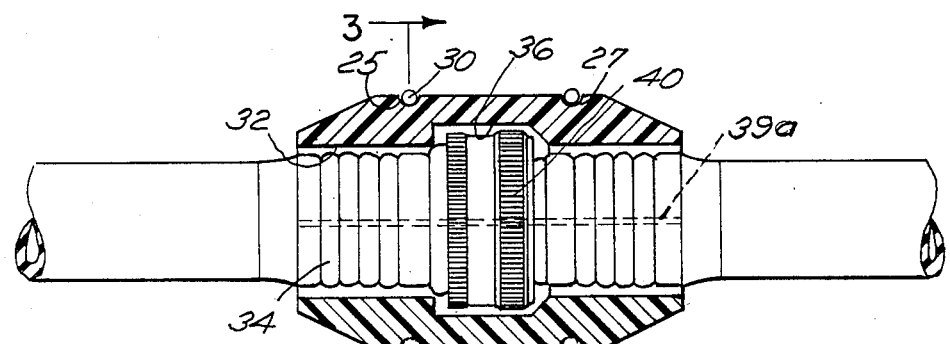
FIG. 2 is a longitudinal sectional view of the coupling protector illustrated in FIG. 1.
Figure 3:
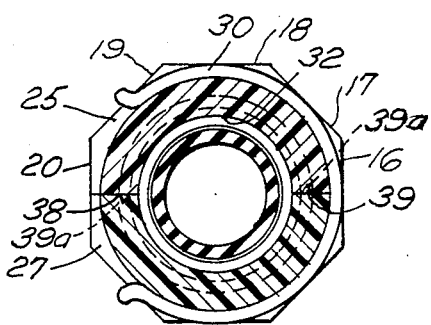
FIG. 3 is a sectional view taken on lines 3—3 of FIG. 2.

Referring to FIG. 1, there is seen a hose coupling protector which is moulded from impact resistant material such as polypropylene and is comprised generally of a first half 12 and a second half 14 which are essentially half cylindrical shapes. Each shape has an outer wall which defines a plurality of surfaces that are non-circular there being illustrated a hexagonal surface where each half has three distinct surfaces as for example (see FIG. 3), surfaces 16, 17, 18, 19, and 20 for one half section. The outer wall of the section is also tapered as generally indicated at 22 and 23. As illustrated in FIGS. 1, 2, and 3, the outer walls have a pair of grooves 25, 27 therein into which there may be fitted a snap ring such as 30 to hold the two halves together.

The inner wall 32 of the half section 12 which is used as an example is cylindrical and is sized to be slightly larger than the ferrule 34 of the hose coupling. The inner wall is also provided with a central chamber 36 and into this central chamber the female fastening 40 of the hose coupling may loosely fit. It will be apparent as this description proceeds that each half of the coupling protector has an identical structure and therefore only one half has been described for brevity and clarity. With reference particularly to FIG. 3, it will be seen that the two halves have longitudinal edges which could be defined by edges 38 and 39 and these edges are provided along their length with at least some interengaging portions which are seen in FIG. 3 as protrusions and depressions and are designated 39a. In this fashion, the two halves of the protector can be readily aligned.

Figure 5:
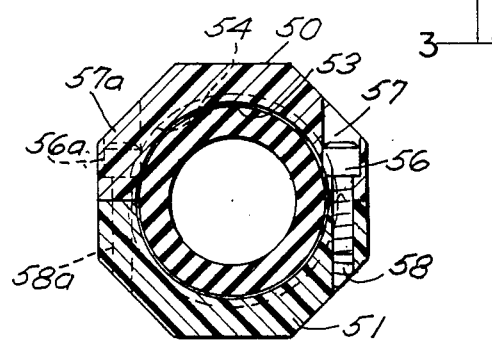
FIG. 5 is a sectional view taken on lines 5—5 of FIG. 4.
Figure 4:
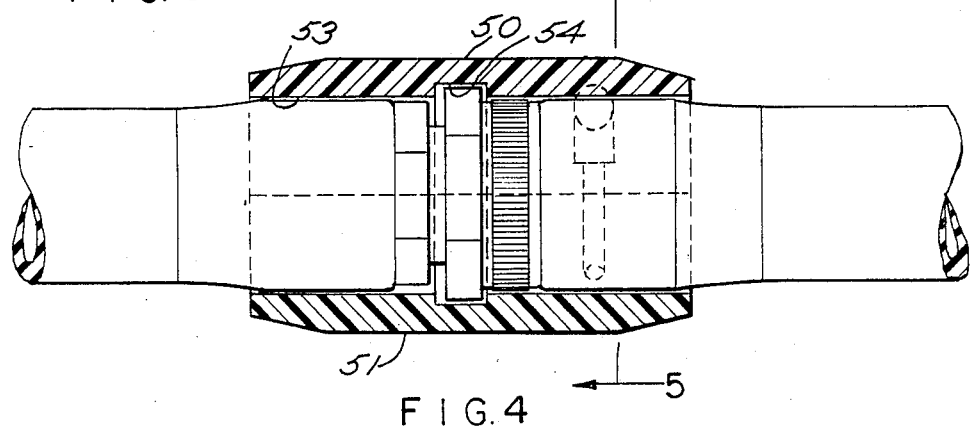
FIG. 4 is a longitudinal sectional view illustrating the coupling protector applied to an industrial hose coupling.

Referring now to FIGS. 4 and 5, there is shown an industrial model of a hose coupling which is similar in all respects to the hose coupling previously described and has two halves of 50 and 51 which have a plurality of faces on the outer surface thereof, while the inner wall has a cylindrical surface 53 with a central chamber 54. As in the previous embodiment, clearance is provided between the ferrule of the hose and/or the nut of the coupling so that the protector may be revolve thereabout. To hold the two halves together, there is illustrated a pair of socket head fasteners such as a fastener 56, 56a which are received respectively in bores 57, 57a that are threaded as at 58, 58a in the other half section.

I claim:

1. A device for protecting hose couplings, said hose couplings having a female fastening portion and a male fastening portion threadingly interconnected, and restricted against relative rotation, a housing having a first half portion and a second half portion which are similar and are constructed of impact resistant material, each half having an outer wall of non-circular section with tapered end portions, each half having longitudinal edges and interengaging means on said edges to align the two halves, each half having an inner wall defining a semi-circular recess of uniform radius with a separate large radius central semi-circular chamber therein for the reception of the female fastening portion of the coupling, said recesses and chamber permitting the housing to rotate about the coupling and locking means fastening the two halves together.

* * * * *